April 15, 1952 C. W. LEGUILLON 2,592,916
SELF-LAYING TRACK FOR VEHICLES
Filed Feb. 26, 1949
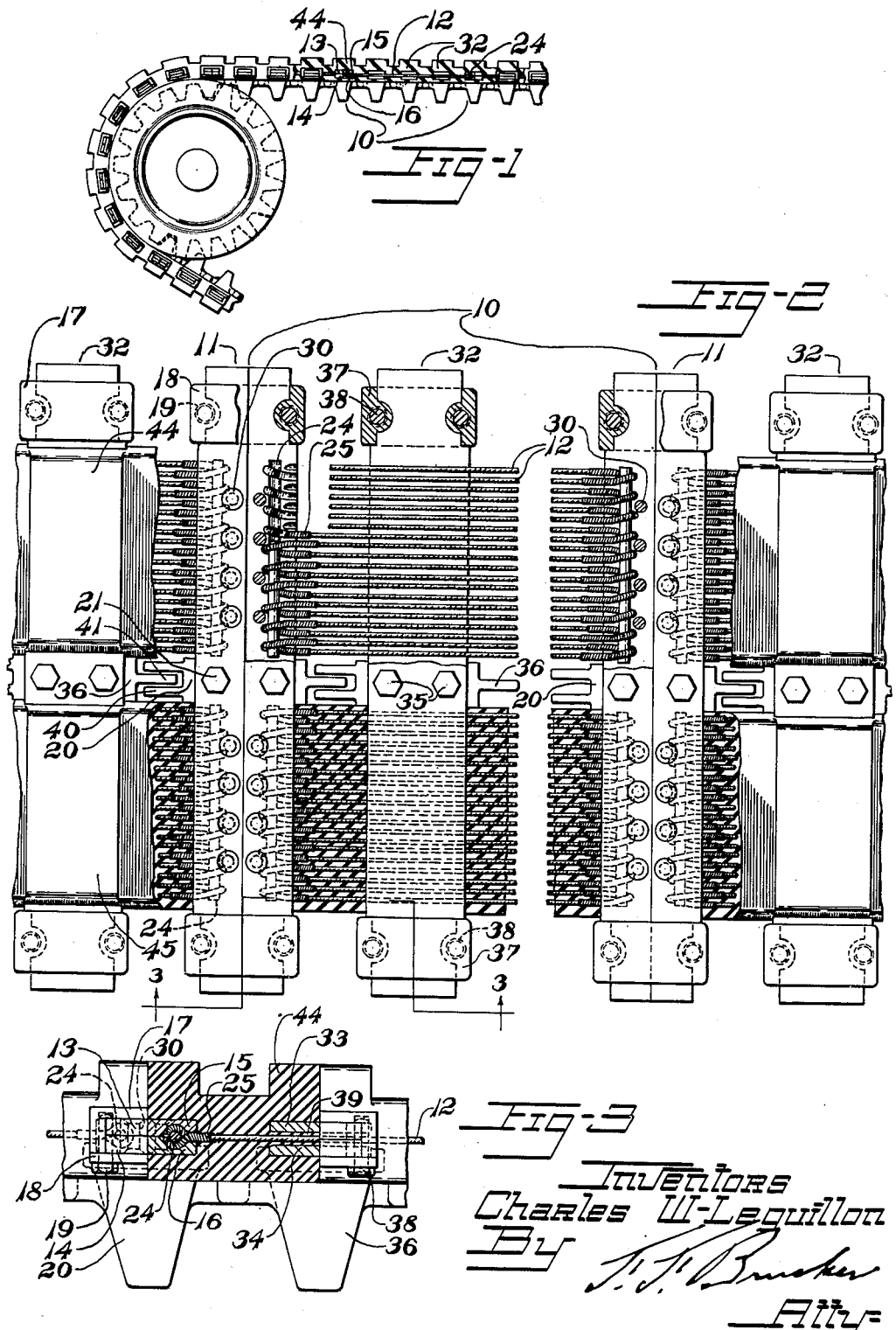
Inventors
Charles W. Leguillon
By
T. T. Brucker
Atty.

Patented Apr. 15, 1952

2,592,916

UNITED STATES PATENT OFFICE 2,592,916

SELF-LAYING TRACK FOR VEHICLES

Charles W. Leguillon, Akron, Ohio, assignor to The B. F. Goodrich Company, New York, N. Y., a corporation of New York Application February 26, 1949, Serial No. 78,643

7 Claims. (Cl. 305—10)

This invention relates to self-laying tracks for vehicles and is especially useful in the construction of flexible band tracks for tractors, military tanks, agricultural and excavating vehicles having strands of flexible metal cable embedded in rubber for sustaining the tension load and secured to driving and coupling bars.

In prior attempts to make the track open-ended or in detachable sections, difficulty has been experienced in anchoring a sufficient number of cable strands in a given width of track and difficulty has also been experienced in preventing breakage of the cables where they were anchored at connecting bars. While the reinforcement of the cables at the position of anchorage by a reinforcement thereabout of coiled wire, as proposed in my Patent No. 2,385,453 has prevented breakage of the cables at the position of anchorage it has been found that the possible number of cables provided by that construction was not always sufficient to safely handle the load.

The present invention has for an object to overcome the foregoing and other difficulties by providing for anchorage of a greater number of strands of cable in a given width of track.

Other objects are to provide for use of anchoring pins of greater diameter, to provide for anchoring a plurality of looped strands about a single anchoring pin, and to provide for central guiding and side driving of the track.

These and other objects will appear from the following description and the accompanying drawings.

Of the drawings,

Fig. 1 is a side elevation of a portion of the track of the invention and a driving wheel therefor.

Fig. 2 is a plan view of the track, portions being broken away and portions shown in section.

Fig. 3 is a sectional view taken on line 3—3 of Fig. 2.

Referring to the drawings which show a track constructed in accordance with and embodying the invention, the numeral 10 designates a track section having anchoring and connecting bars 11, 11 at its opposite ends to which cable strands 12 are secured. Each connecting bar 11 is assembled of four bars 13, 14, 15, 16 held in a group by U-shaped driving lugs 17 and closure plates 18 at each end of the bars, the closure plates being secured to the driving lugs 17 by screw bolts 19. The bars are also held in assembled relation at their centers by guide lugs 20 having notched seats for receiving them and screw bolts 21 passing through apertures in the bars and engaging the guiding lugs. The arrangement is such that by removing the guiding and driving lugs the track sections may be separated along the plane dividing bars 13, 14 from bars 15, 16.

Bars 13, 14 are longitudinally grooved at their meeting faces to receive an anchoring pin 24 therebetween and also to provide grooves for receiving the cables 12 looped thereabout. Each cable loop is reinforced by a flexible sleeve 25 of coiled wire to strengthen it where it leaves the connecting bar and the clearance grooves are of such size as to permit use of the reinforcements about the cables. As shown in the drawings, the sleeves are of closely wound wire applied over the cable along the looped portion with the ends of the sleeve terminating somewhat beyond the coupling bars 15, 16, which has the advantage of preventing sharp bending of the cables at or near the margins of the bars and of resisting the action of flexing stresses at these portions of the cables. Bars 15, 16 are similarly grooved at their meeting faces to receive a similar anchoring pin and its surrounding cable loops. The cable between connecting bars may be a single strand looped back and forth or may be a series of closed loops. The anchoring pins preferably extend entirely across a group of cables or across the track, although shorter pins arranged end to end may be employed.

By provision of anchoring pins extending parallel to the connecting bars, the cable strands 12 may be spaced closely, permitting more strands than by the construction of my Patent No. 2,385,453. Furthermore anchoring pins of greater diameter may be employed which permit larger loops of the cables and avoid sharp bending thereof.

Bars 13 and 14, and likewise bars 15 and 16 are preferably secured together permanently as by rivets 30, although screws may be used for this purpose.

Intermediate the connecting bars, additional cross bars 32 may be secured to the cable reaches. Each cross-bar comprises two superimposed plates 33, 34 having grooves in their meeting faces to clear the cables. These plates are secured together by screw bolts 35 passing through them and secured to guide lugs 36. The ends of the bars have driving lugs 37 similar to lugs 17 secured about the ends of the plates by screws 38. The passages 39 provided by the meeting grooves of plates 33, 34 are preferably flared at their ends to eliminate sharp bending of the cables where they leave the bars. Also the passages are larger in bore than the diameter of the cables and the space about the cables is filled with rubber-like cushioning material.

The connecting bars and cross bars are arranged along the track at regular intervals and the guide lugs 20 and 36 have guide flanges 40, 41 engaging each other in intercalated sliding relation to stiffen the track against lateral deflection.

The cables 12 and portions of the connecting bars and cross bars adjacent the cables are embedded in bodies 44, 45 of soft vulcanized rubber or other plastic material having the physical properties of soft vulcanized rubber and referred to herein as rubber-like material. These bodies are spaced apart to clear the guiding lugs 20, 36. The rubber-like material is secured to the metal portions of the track by a bond of vulcanization. As the driving and guiding lugs extend beyond the bodies of rubber-like material, the lugs may be removed and replaced when worn and those at the coupling bars may be removed when the track is to be separated or a section replaced. The rubber material is divided at the plane between bars 13 and 15.

In use the guide lugs 20 extend between supporting pulley portions of the driving and guiding wheels and the lugs 17 and 37 are engaged by the driving sprockets.

Variations may be made without departing from the scope of the invention as it is defined by the following claims.

I claim:

1. A self-laying track for vehicles, said track comprising a plurality of cable strands extending side-by-side with their axes in a single transverse plane of the track and terminating in loops at the ends of the track, anchoring pins at the ends of the track and extending with their axes in said plane across the track for engaging a plurality of said loops, said loops being in planes obliquely disposed to said plane of the track and presenting said loops in alignment with said anchoring pins, and means for connecting a pair of anchoring pins to each other.

2. A self-laying track for vehicles, said track comprising a plurality of cable strands extending side-by-side with their axes in a single transverse plane of the track and terminating in loops at the ends of the track, anchoring pins at the ends of the track and extending with the axes of the pins in said plane across the track for engaging a plurality of said loops, said loops being in planes obliquely disposed to said plane of the track and presenting said loops in alignment with said anchoring pins, and means for connecting a pair of anchoring pins to each other, said connecting means comprising pairs of grooved connecting bars for engaging about said pins, and means for holding said bars in engagement with an anchoring pin.

3. A self-laying track for vehicles, said track comprising a plurality of cable strands extending side-by-side with their axes in a single transverse plane of the track and terminating in loops at the ends of the track, anchoring pins at the ends of the track and extending with the axes of the pins in said plane across the track for engaging a plurality of said loops, said loops being in planes obliquely disposed to said plane of the track and presenting said loops in alignment with said anchoring pins, and means for connecting a pair of anchoring pins to each other, said connecting means comprising pairs of companion connecting bars having grooved meeting faces for engaging about an anchoring pin and its cable loops, and clamping members for holding the companion connecting bars about said pin.

4. A self-laying track comprising a plurality of cable strands extending in closely spaced relation longitudinally of the track in a single plane, anchoring pins at the ends of the track, said pins each extending crosswise of the track with its axis in the plane of the cable strands, laterally adjacent strands being connected by helical loops thereof encompassing said anchoring pins, a connector at each end of the track, each connector comprising a pair of complemental bars extending cross-wise of the track and having complemental grooves for confining one of said anchoring pins and its encompassing loops, and means for clamping said bars about said anchoring pins, said bars being adapted to hold said cable strands in said single plane.

5. A self-laying track as defined by claim 4 having a covering of rubber material about said cable strands between said connectors and secured to said strands and said connectors by a bond of vulcanization.

6. A self-laying track comprising a pair of anchoring pins having their axes parallel one to another, a flexible cable looped alternately about said pins to provide a series of parallel laterally adjacent strands of cable extending from one anchoring pin to another, and track coupling members at each anchoring pin, said track-coupling members each comprising a pair of longitudinally grooved bars adapted to be clamped about an anchoring pin for retaining the pin in the grooves of the bars, said bars holding the strands of cable between anchoring pins with their axes in a single plane with the spacing of the strands in said plane substantially equal to one half the spacing of the cable loops about said pins.

7. A self-laying track comprising a pair of anchoring pins having their axes parallel one to another, closed loops of flexible cable encompassing said pair of pins in side-by-side spaced relation to provide a series of parallel laterally adjacent strands of cable extending from one anchoring pin to another, and track coupling members at each anchoring pin, said track-coupling members each comprising a pair of longitudinally grooved bars adapted to be clamped about an anchoring pin for retaining the pin in the grooves of the bars, said bars holding the strands of cable between anchoring pins with their axes in a single plane with the spacing of the strands substantially equal to one half the spacing of the cable loops about said pins.

CHARLES W. LEGUILLON.

REFERENCES CITED

The following references are of record in the file of this patent:

UNITED STATES PATENTS

| Number | Name | Date |
|---|---|---|
| 2,410,507 | Knight | Nov. 5, 1946 |

FOREIGN PATENTS

| Number | Country | Date |
|---|---|---|
| 291,903 | Great Britain | June 14, 1928 |
| 742,412 | France | Dec. 27, 1932 |